Figure 1:
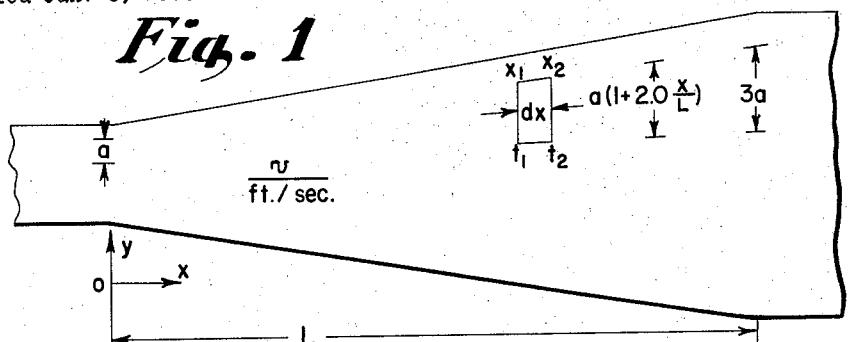
Figure 1A:
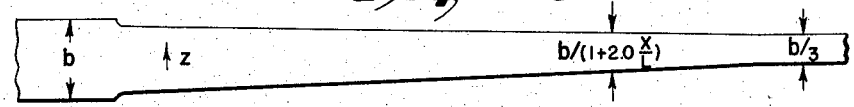

Sept. 16, 1958  W. J. PANGONIS ET AL  2,851,733
PROCESS OF STRETCHING THERMOPLASTIC FILM
Filed Jan. 3, 1956  3 Sheets-Sheet 3

INVENTORS
WILLIAM J. PANGONIS
VERNE L. SIMRIL
BY
ATTORNEY

, 1958

2,851,733

PROCESS OF STRETCHING THERMOPLASTIC FILM

William J. Pangonis, West Chester, Pa., and Verne L. Simril, Williamsville, N. Y., assignors to E. I. du Pont de Nemours and Company, Wilmington, Del., a corporation of Delaware Application January 3, 1956, Serial No. 557,066

12 Claims. (Cl. 18—48)

This invention relates to a process of stretching thermoplastic polymeric films and, more particularly, to a process of maintaining or improving the original gauge uniformity of a thermoplastic polymeric film, such as polyethylene terephthalate, during stretching.

Many types of thermoplastic polymeric films must be oriented, i. e., by stretching and/or rolling in one or two directions, to be converted into useful materials. Polyethylene terephthalate is a typical example of this type of material, and the process of the present invention, although applicable to similar types of thermoplastic polymeric films, will be described with particular reference to polyethylene terephthalate film.

The preparation of polyethylene terephthalate is fully described in U. S. Patent 2,465,319 to Whinfield and Dickson. Film from polyethylene terephthalate may be formed by extruding the molten polymer at temperatures in the neighborhood of 300° C. onto a smooth, cool, quenching surface to obtain the film in substantially amorphous form. To convert this film into a highly useful article of commerce, the film must be oriented by stretching and/or rolling it in one or two directions with or without a subsequent heat-setting step. For a wide variety of applications, it is preferred to stretch and/or roll the film in two mutually perpendicular directions to form a substantially-balanced film having physical properties, such as tensile strength, elongation, tensile modulus, etc., substantially the same as measured in both directions. A balanced film is normally formed by elongating the film by stretching and/or rolling the film to substantially the same degree in two directions. For example, a substantially-balanced film is one which has been stretched 3X, where X equals the original dimension of the film, in each of two mutually perpendicular directions.

In the process of stretching substantially amorphous polyethylene terephthalate and like thermoplastic "cast" film or "as cast" film, it has been found that gauge variations, i. e., thick and thin areas, in the cast film, resulting from minute non-uniformities in the extrusion orifice, are amplified by stretching the film, and in many cases the final gauge variation of the stretched film was intolerable even though the gauge variation of the initial "as cast" film was within acceptable limits.

Gauge variations in polyethylene terephthalate film, and this is true for any thermoplastic film, present serious problems in handling the continuous lengths of film in windup equipment and slitting machines. For example, thick sections, which are formed in longitudinal paths in a continuous length of film, give rise to wound rolls having surfaces which are very hard above the thick sections and consequently are soft above the thin sections. Such rolls have a tendency to telescope in winding and unwinding operations as well as in transit. Furthermore, it is difficult to maintain even tension upon film having high gauge variations, and this makes slitting difficult. On the other hand, film having a relatively high gauge variation is also difficult or impossible to handle in various types of converting equipment, such as bag-making machinery. Such film of variable gauge does not work well in various pieces of commercial equipment, such as cameras and photographic projectors, and in sound recording equipment where a film tape is employed.

An object of the present invention, therefore, is to provide an improved stretching process for thermoplastic polymeric films. A still further object is to provide an improved two-way stretching process for polymeric thermoplastic films, particularly polyethylene terephthalate film. A further object is to provide a two-way stretching process for producing stretched polyethylene terephthalate film having a gauge variation which is not substantially greater and usually less than the gauge variation of the cast film. A still further object is to provide a process of preparing a stretched, polyethylene terephthalate film having superior physical properties over those polyethylene terephthalate films prepared by stretching processes practiced heretofore. Other objects will be apparent from the following description of the invention.

These objects are realized by the present invention which, briefly stated, comprises heating thermoplastic polymeric film having gauge variations and a maximum initial, i. e., "as cast" film thickness of not over 20 mils to a uniform temperature substantially above its second order transition temperature and below the temperature at which molecular orientation is not effected by stretching, stretching the film in the direction in which said gauge variations are measured, while extracting heat, i. e., cooling the film, at a rate sufficient to create and maintain a temperature differential between thick and thin areas of the film, and completing stretching before the temperature of any area of the film is cooled to the second order transition temperature.

The present invention resides in the discovery that by following the process defined herein, the initial, i. e., cast film, gauge variation may be maintained constant, i. e., not be amplified as in stretching processes practiced heretofore, and in many cases actually reduced, which means that the stretched film gauge may be made more uniform. Furthermore, it has been found that the physical properties of two-way stretched, heat-set, polyethylene terephthalate film prepared by this process has significantly improved physical properties over similar film produced by any other known stretching process. The success of the present stretching process appears to be due to the fact that the conditions of stretch defined by this invention create temperature differentials between the thin and thick areas of the film during stretching. Theoretically, in view of the fact that the force required to stretch the film drops appreciably as the temperature of the film increases, areas of the film which are at a lower temperature than adjacent areas will stretch to a lesser degree under a given stretching force. This is because the areas at a lower temperature will exert a greater resistance to elongation (under a given overall stretching force) than areas of the film at higher temperatures. The stretching conditions defined by the present invention are such as to extract heat from thinner areas of a film during stretching at a greater rate than heat is extracted from thicker areas. Consequently, during stretching under a constant overall stretching force, i. e., the same stretching forces are applied to both thick and thin areas, the thick areas (at a higher temperature) will stretch to a greater extent than the thin areas (at a lower temperature).

While the process of the present invention will hereinafter be described with specific reference to polyethylene terephthalate film, it is to be understood that the process is applicable to all thermoplastic polymeric films which have tensile properties which vary appreciably with incremental changes in temperature, particularly in the region of the second order transition temperature of the film. Representative thermoplastic, polymeric films which may be stretched in accordance with the present process are films of polyesters formed by reacting terephthalic acid, or low alkyl esters thereof, with a glycol of the general formula $HO(CH_2)_nOH$, wherein $n$ is an integer from 2 to 10 inclusive, and a second acid or low alkyl ester thereof from the group consisting of such aliphatic acids as sebacic acid, adipic acid, and aromatic carboxylic acids such as isophthalic acid, 1,5 naphthalic acid, 2,6 naphthalic acid, and hexahydro-terephthalic acid; of polyamides, such as polyhexamethylene adipamide, polyhexamethylene sebacamide and polycaproamide, etc.; and of vinyl and vinylidene polymer films such as polyethylene, polyvinyl fluoride, polyvinylidene chloride, and rubber hydrochloride; polystyrene; and high molecular weight condensation polymeric films such as those from polymeric formaldehyde.

As specified hereinbefore, stretching in accordance with the present process must be carried out at a temperature substantially above the second order transition temperature of the polymeric film and below the temperature at which molecular orientation is not effected by stretching. The second order transition temperature is defined as the temperature at which a discontinuity occurs in the curve of a first derivative thermodynamic quantity with temperature. It is correlated with yield temperature and polymer fluidity and can be observed from a plot of density, specific volume, specific heat, sonic modulus, or index of refraction against temperature.

A satisfactory method of measuring the second order transition temperature of polyethylene terephthalate is described in Pace (U. S. P. 2,578,899) wherein the linear expansion of a plug of polymer is observed with changes in temperature. The second order transition temperature in this case is that temperature at which a discontinuity occurs in plotting the course of temperature vs. incremental linear expansion.

A satisfactory alternative method which may be employed for determining second order transition temperature is dependent upon the change in the specific heat of the polymer at that temperature. If a polymer is heated at a constant rate beginning at a temperature below its second order transition temperature, the temperature will increase at a constant rate until a transition temperature is reached at which point a break in the curve will occur. The determinations are made by placing the insoluble polymer with either n-heptane or toluene at a temperature below its second order transition temperature in a calorimeter. A constant rate of heating is obtained using an electrical heater connected to an E. M. F. source which may be varied at will. The powdered polymer is kept suspended in an electric stirrer turning at constant speed. The temperature is measured by means of a copper-constantan thermocouple with an ice water reference. After the calorimeter has reached equilibrium, the current is turned on so that the temperature will rise about 1° C. per minute. The zero reading is selected at a point at least 20° C. below the transition temperature. Thereafter, the elapsed time is read off a stop watch to the nearest 100 of a minute for every degree centigrade rise in temperature. After going 10°–20° C. higher than the inflection point, as noted from the data, the information is plotted to show the course of the curve of specific heat vs. temperature.

The second order transition temperature of amorphous polyethylene terephthalate having a substantially low quantity of diethylene glycol terephthalate component, was found to be about 69° C. By heating polyethylene terephthalate film to temperatures at or substantially above this point, the polymer becomes rubbery with a resultant increase in elasticity. Attempts to stretch amorphous polymer at appreciable stretching rates (above about 400% per minute) below the second order transition temperature result in appreciable film breakage.

In carrying out the present invention for stretching any type of thermoplastic polymeric film within a temperature range above its second order transition temperature and below the temperature at which molecular orientation is not effected, the temperature differential maintained between thick and thin areas of the film in order to derive the benefits of this invention should be within the range from about 0.5° C. to about 2.5° C. If the finite temperature differential of at least 0.5° C. is not created and maintained between the thick and thin areas of the film during stretching, no significant advantages over the known techniques of stretching, as respects film gauge variation, will be realized. Owing to the relatively rapid rates at which stretching must be carried out in commercial practice, and the relatively thin films being stretched in accordance with this invention, it is extremely difficult to effect and maintain temperature differentials between thick and thin areas greater than about 2.5° C. For polyethylene terephthalate film, in the temperature range wherein stretching is to be carried out, the thicker areas of the film should preferably be maintained at a temperature from 0.75° C. to 1.75° C. higher than the thinner areas in order to attain an actual decrease in the gauge variation of a film having an initial gauge variation (prior to stretching) of 1.10.

In order to determine the temperature (i. e., cooling) conditions required to obtain the necessary temperature differential in stretching a given film to a predetermined extent at a predetermined rate, it is necessary to predict the temperature pattern of a given section or differential portion of a constant thickness of film during its course of travel through a stretching apparatus. By following the temperature changes of a given thickness of film (corresponding to the thickness of the thin areas of the film) under fixed conditions, and by following the temperature pattern of a thicker film (corresponding to the thickness of the thick areas of the film) as it goes through a stretching apparatus under the same fixed conditions, the conditions necessary to effect and maintain a temperature differential between thick and thin areas of the same film may be determined.

Referring to Figure 1, which is a diagrammatic illustration of a film undergoing stretch in one direction, the film is moving in the $x$ direction and being stretched in the $y$ direction. The length of the stretcher, or more accurately, the length over which stretching takes place is represented by L. During stretching, heat is generated within the film and this generated heat is carried away from the film by cooling air which may, for example, be blown perpendicularly onto the film from nozzles located above and below the film for the distance through which the stretching takes place. Heat loss by radiation to the walls of the stretching apparatus (the temperature of the walls is not far different from the film temperature) is negligible and may be disregarded. Likewise, heat conduction along the length or across the width of the film is considered negligible as compared with heat conducted through the thickness of the film. In passing through the stretching zone pictured in Figure 1, a section of film of initial thickness, $b$ (see Figure 1 ($a$) which is a side view of the film in Figure 1), and width, $a$, is reduced to thickness, $b/3$ (film is stretched 3X), and stretched to a width $3a$. The volume and weight of a given element of film remains constant during stretching. A heat balance on a differential element of film as it moves at uniform speed, $v$, from position $x_1$ to position $x_2$, a distance of $dx$, in time $d\theta$ yields:

$$WC_p(t_2-t_1) = Q_s V dE - hA(t-t_a)d\theta \qquad (1)$$

where $W$ = weight of the film segment, pounds
$C_p$ = specific heat of film B. t. u./(lb.)(°F.)
$Q_s$ = heat generated by stretching per unit volume, per elongation, B. t. u./(cu. ft.)
$V$ = volume of film segment
$E$ = percent elongation $h$ = convective heat transfer coefficient, B. t. u./(sec.) (sq. ft.) (°F.)
$A$ = heat transfer area, sq. ft.
$t$ = surface temperature of film, °F.
$t_a$ = temperature of air, °F.
$t_1$ = surface temperature of film at $x_1$
$t_2$ = surface temperature of film at $x_2$ At any point in the film, the temperature drop from the film surface to its center line can be shown to be negligible compared to the temperature drop from the film surface to the cooling air. In the following, therefore, it is assumed that at any given point in the stretcher, the temperature, $t$, of the film is constant in the $z$ direction. That is, $t$, the surface temperature, is also the mean film temperature at a given $x, y$ position.

Now, for a total elongation through the stretcher of 200%, the percent elongation at a given position, $x$, in the stretcher is 200 $(x/L)$, and the change in percent elongation, $dE$, in a distance, $dx$, is:

$$dE = 200 d(x/L) \qquad (2)$$

where $L$ is the length of the transverse stretch section in feet. The time, $d\theta$, in seconds is given by:

$$d\theta = \frac{dx}{v} = \frac{L}{v} d(x/L) \qquad (3)$$

where $x$ is in feet, and $v$ in feet/sec.

The area for convective heat transfer from both sides of the film is:

$$A = 2a\left(1 + [2.0]\frac{x}{L}\right)(dx) \qquad (4)$$

Making the appropriate substitutions in Equation 1 yields:

$$-\rho ab(dx)Cp(dt) = 2ha\left(1 + 2.0\frac{x}{L}\right)(dx)(t-t_a)\left(\frac{L}{v}\right)d(x/L) - Q_s ab(dx) 200 d(x/L) \qquad (5)$$

where $\rho$ is the film density in lb./cu. ft. Simplifying this gives:

$$-\frac{dt}{d(x/L)} = \frac{2hL\left(1 + 2.0\frac{x}{L}\right)(t-t_a)}{\rho C_p bv} - \frac{200 Q_s}{\rho C_p} \qquad (5a)$$

In terms of total time in the stretcher $\theta_T$ (which equals $\frac{L}{v}$) the equation may be expressed:

$$-\frac{dt}{d(x/L)} = \frac{2h\theta_T\left(1 + [2.0]\frac{x}{L}\right)(t-t_a)}{\rho C_p b} - \frac{200 Q_s}{\rho C_p} \qquad (5b)$$

or in terms of rate of elongation, S, in percent elongation/sec.:

$$-\frac{dt}{d(x/L)} = \frac{400h\left(1 + [2.0]\frac{x}{L}\right)(t-t_a)}{\rho C_p bS} - \frac{200 Q_s}{\rho C_p} \qquad (5c)$$

Equation 5a above is the differential equation relating the temperature of any element of film in the stretching apparatus with its thickness, velocity, heat of stretching and heat transfer environment. This equation permits computation of temperature differences which exist (or can be made to exist), between sections of film of different initial thickness, $b$, under a given set of operating conditions. While the number of variables appears large, it will be seen that the only important variable which may be controlled is the temperature of the air, $t_a$, surrounding the film during stretching. In a continuous process, even the product $(bv)$ is reasonably constant, because the film is moved through the stretching apparatus at a relatively fixed rate of speed.

Equation 5a can be considerably simplified, and the following illustration will be concerned with stretching polyethylene terephthalate film. The temperature range in the stretcher is sufficiently narrow to consider $\rho$ and $C_p$ constant at 84 lb./cu. ft. and 0.4 B. t. u./(lb.) (°F.), respectively. Since the velocity of the air may be fixed, and for the purpose of illustration this velocity will be fixed at 10–13 ft./sec., $h$ may be considered essentially constant at a value of 5 B. t. u./(hr.) (sq. ft.) (°F.) or $1.4 \times 10^{-3}$ B. t. u. (sec.) (sq. ft.) (°F.). The value of $Q_s$, equal to 6.75 B. t. u./(cu. ft.) (percent elongation), is considered to be reasonably constant throughout the stretching range illustrated herein for stretching polyethylene terephthalate film. Grouping the constant terms of the equation and substituting their numerical values yields the following equation:

$$-\frac{dt}{d\left(\frac{x}{L}\right)} = 0.99(L/mv)\left(1 + 2.0\frac{x}{L}\right)(t-t_a) - 40 \qquad (5d)$$

where $m$ is the initial film thickness in mils.

Since Equation 5a and its alternate forms are nonlinear, they cannot be solved analytically. Instead, the differential equation must be put into its finite difference form (see Milne, E. E. "Numerical Solution of Differential Equations," chapter 4, John Wiley, N. Y., 1953) and solved numerically.

Figure 2:
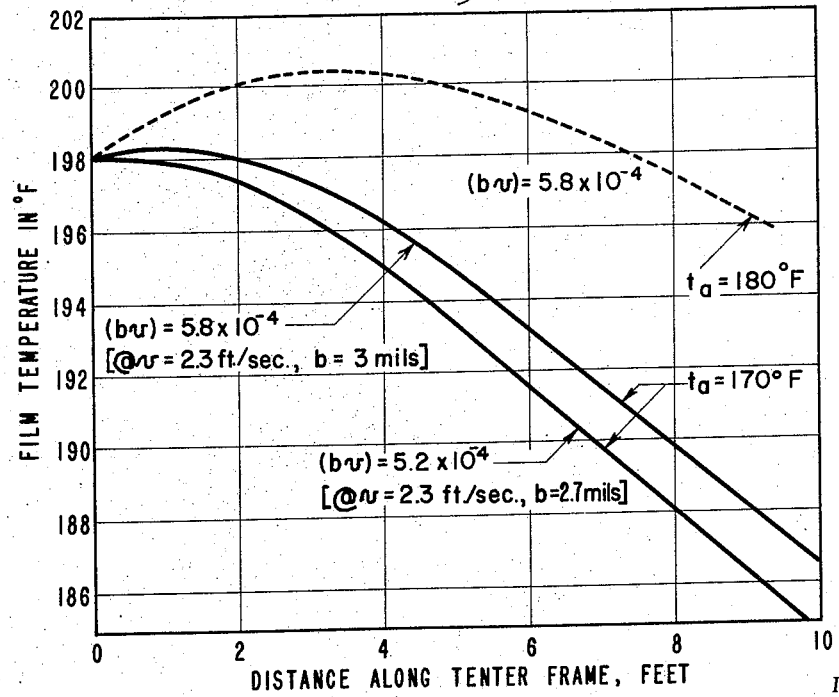
Figure 3:
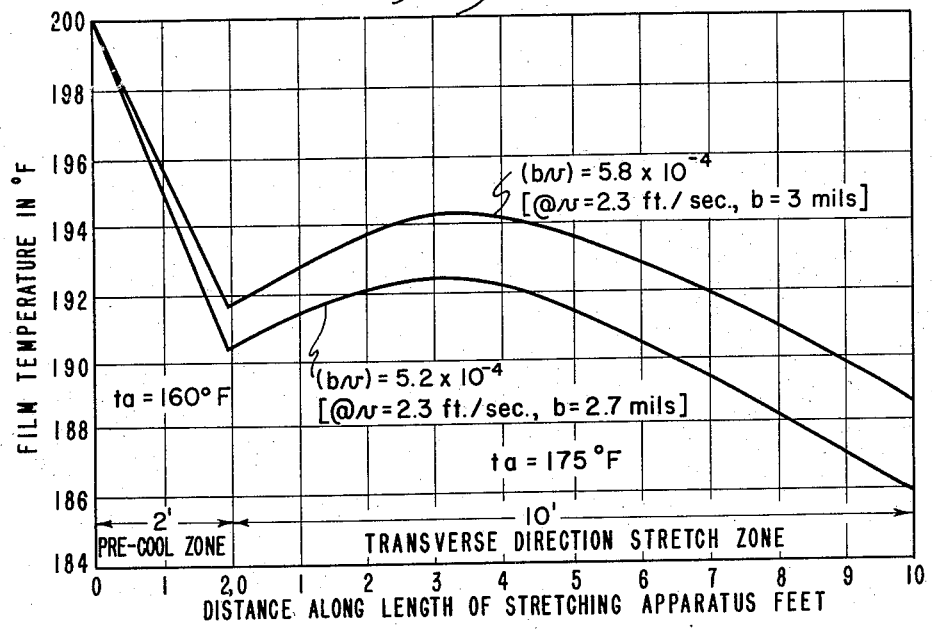

Figure 2 is typical of the solutions obtained to Equation 5d. It gives the temperature of sections of the film as a function of distance along a 10-foot stretching apparatus which may be employed to stretch film continuously, in the transverse direction (TD) or $y$ direction. In the specific illustration given in Figure 2, the film is assumed to enter the stretching apparatus at 198° F. (94° C.), i. e., 25° C. above the second order transition temperature for the polymer. The dotted line in Figure 2 represents the temperature course of film as it moves through the stretcher and is surrounded by air at 180° F. (82.5° C.). The solid line curves in Figure 2 represent the temperature courses which would be followed by two films (differing in initial thickness by 10%, i. e., representative of thick and thin areas of film) as they move through the stretcher and are surrounded by air at 170° F. This shows that temperature differences of about 1° F. (about 0.5° C.) can be established between film areas of different thicknesses, e. g., 2.7 mils vs. 3 mils, under the stretching conditions specified. The maxima in the curves are due to the fact that the area for convective heat transfer increases as the film is stretched. Larger temperature differences can be established by cooling more rapidly at the start of the stretch, preferably at a rate sufficient to effect one-half of the total film temperature drop in the first 25% of the total stretch, and tapering off slowly towards the end of the stretch. For example, air at 160° F. (71.5° C.) may be used in the first 20% of the stretch, while air at 185° F. (85° C.) may be used for the remaining 80% of the stretch. Even greater differences in temperature between thick and thin areas can be obtained by rapidly precooling the uniformly heated film before the stretch. This is illustrated in Figure 3, where air at 160° F. was used in the precooled zone.

The foregoing typical solutions of Equation 5d clearly illustrate the procedure for establishing the conditions necessary to effect adequate temperature differences, e. g., 0.5° C.–2.5° C., in the case of polyethylene terephthalate film, between the thick and thin portions of a homogeneous film for any particular set of stretching conditions and for any particular film. It is necessary to fix such variables as rate of stretch, extent of stretch, temperature range within which stretching is to be carried out, type of film, length of stretching apparatus, type of cooling for decreasing temperature, e. g., position of air nozzles and velocity of cooling air, and other significant variables pertinent to the overall stretching conditions. Once these variables have been fixed for any specific film and apparatus, the essential ambient temperatures to be employed for cooling the film during stretching may be determined in order that a temperature differential between thick and thin areas of at least about 0.5° C. will be established. Once these temperature conditions have been established, theoretical self-compensating factors of the present invention are effected; that is, the thinner areas of the film will be stretched to a lesser extent than adjacent thicker portions because the thinner areas offer a greater resistance to stretching under a given stretching force. In all of the foregoing discussion and in the examples to follow, the temperatures recited, unless identified as ambient temperatures or temperatures of the air surrounding the film, are to be understood to be the actual temperature of the film. In the examples to follow hereinafter, the film temperature has been measured by an accurately calibrated and shielded thermocouple which will be described hereinafter.

When the present invention is applied to polyethylene terephthalate film, it is desirable to stretch this film in two directions under conditions effective to produce film having substantially balanced physical properties, i. e., physical properties which are substantially the same as measured in both directions. Hence, the terms "first direction stretch" and "second direction stretch" will be employed hereinafter, when the film is being stretched in two directions, to apply to the first and second direction stretching steps respectively. Usually, to obtain balanced physical properties, the film will be stretched to the same extent from 2 to 3.25X (where X is the original dimension of the film) in both directions. On the other hand, for special end uses, the film may be stretched to different extents in both directions, and the extent of stretch may be as high as 5X or greater in one or both directions. It should be understood that both stretching steps may be carried out while the film is being cooled, but the first direction stretch may be carried out at a constant temperature within the range from 90°–94° C. In such cases where the film is stretched at a constant temperature (isothermally) during the first direction stretch, the second direction stretch is carried out while the film is being cooled from 2° C. to 4.5° C. below the temperature of the first direction stretch. Preferably, stretching is carried out at a rate of about 1800 feet per minute. In the stretching art, the terms "machine direction" or "longitudinal direction" are employed to relate to stretching of film in its lengthwise direction, and the term "transverse direction" is employed to refer to stretching of film in its width-wise direction. Whether or not a film is stretched first in the longitudinal direction or first in the transverse direction is immaterial in the present process.

To form a polyethylene terephthalate film having good dimensional stability at elevated temperatures, the above-defined stretching process is followed by heat-setting the stretched film for a short duration within the range from 150°–250° C. while restricting dimensional change.

In the examples to follow, the terms "cast (film) gauge variation," "stretched (film) gauge variation" and "magnification ratio" will be used. The mathematical expressions employed to define these terms contain the components which are defined as follows:

$x_c$ = thickness of the thickest film section of cast film
$y_c$ = thickness of the thinnest film section of cast film
$x_s$ = thickness of the thickest section of stretched film
$y_s$ = thickness of the thinnest section of stretched film
$X_c$ = cast (film) gauge variation where $$X_c = \frac{x_c}{y_c}$$

$X_s$ = stretched (film) gauge variation where $$X_s = \frac{x_s}{y_s}$$

The gauge performance of the stretched film, i. e., the effect of the stretching operation upon the original cast film gauge, is expressed in terms of the "magnification ratio" which is expressed as $$MR = \frac{X_s}{X_c}$$

If the magnification ratio is greater than 1 (greater than unity), it means that the original cast film gauge variation has been magnified or increased as a result of the stretching operation. However, insofar as commercial operation is concerned, with respect to polyethylene terephthalate film, it is desirable to cast a film having a low cast film gauge variation and, thereafter, stretch the film in two directions under such conditions that the resulting magnification ratio is as close to unity as possible, and preferably less than unity.

The following examples will serve to further illustrate the principles and practice of the present invention.

In carrying out the stretching operation in accordance with the present process steps, the apparatus employed consisted of two essential parts, namely, a stretching section and a heater-blower system. The stretching section of the apparatus consisted of four groups of clamps for grasping each edge of the film. The two opposing groups along the length of the film consisted of 5–7 clamps in each group, and the two opposing groups clasping the width-wise edges of the film consisted of 5 clamps in each group. The opposing groups of clamps were set up to operate in unison, that is, to move in opposite directions to stretch the film first in one direction, and then in the second direction. The clamps also restricted dimensional change in the film in the direction opposite to that in which the film was being stretched. That is, when the film was being stretched in the lengthwise direction, dimensional change in the widthwise direction, e. g., neck-in, was substantially prevented. Likewise, when the film was being stretched in the widthwise direction, change in the lengthwise direction, i. e., film shrinkage under the elevated stretching temperature conditions, was restricted. In carrying out the present process dimensional change in the direction opposite to that in which the film is stretched is usually less than 5–10%.

The entire stretching unit was enclosed and thermally insulated from the atmosphere, and the heating system consisted of a blower and heater about 2 feet beneath the film. This blower and heater were connected to the underside of the film by means of a duct. Auxiliary heaters were installed below the film and within the entire closure, and these were controlled by means of autotransformers; and dampers were employed to control the flow of hot air currents. The blower-heater below the film was employed to raise the temperature slowly in the closed apparatus, and the main function of this heat source was to insure a turbulent flow of air in order to maintain a high degree of uniformity of temperature. An additional auxiliary heater installed immediately below the film but above the heater-blower apparatus, along with dampers, and additional auxiliary heaters installed within the entire closure containing the stretcher, were employed to produce sudden rises or declines in the temperature as required.

A completely shielded, accurately calibrated thermocouple having a surface exposed only to the film surface was mounted upon the film surface, and the thermocouple was connected to a Brown Instrument Company Recorder to give a continuous record of the time—temperature relationships during the overall stretching operation. The temperature indicated in subsequent examples and illustrations represents the actual surface temperature of the thin films being stretched.

EXAMPLE 1

A 5" x 5" sheet of amorphous polyethylene terephthalate (having a second order transition temperature of 69° C.) film was clamped securely in a stretching apparatus of the type described above wherein each edge of the film was clamped with five clamps. Two parallel lines were drawn across the film, these lines running parallel to the intended second direction of stretch. These lines were not drawn out to the edges of the film but came within 1½" of the edges. The thickness of this cast film was then measured at ¼" intervals along each of these lines using an Ames thickness gauge. The results of these measurements were recorded as follows:

Upper line of cast film:
    Thickest section $x_c = 14.9$ mils
    Thinnest section $y_c = 13.4$ mils Lower line of cast film:
    Thickest section $x_c = 14.9$ mils
    Thinnest section $y_c = 13.5$ mils

|  | Upper Line | Lower Line |
|---|---|---|
| Cast film gauge variation $= X_c = \dfrac{x_c}{y_c} = 1.11$ | | 1.10 |

As described above, the stretching apparatus was maintained in a completely closed, insulated system, and when the insulated top of this closure was placed over the stretcher, a shielded thermocouple suspended from the top directly contacted the upper surface of the film. This thermocouple was thermally shielded from the atmosphere between the top of the closure and the upper surface of the film. In operating the apparatus, the blower beneath the film was turned on, the damper on an auxiliary heater housing was opened, and the heating element underneath the film was turned on.

In the first direction of stretch, that is, in the final portion of this step, the auxiliary heater-damper was partially closed, and the heater element below the film was turned down. This caused the temperature of the film to drop, and the pattern of this temperature drop was adjusted by proper manipulation of the damper and heating element. Hence, by proper manipulation of the available heating and damping sources, the film was caused to cool during the second direction of stretch.

In the first direction stretch, the film was heated up to 93.2° C. in 35 seconds and stretched at this temperature to an extent of 3X (200% elongation) in 6.7 seconds (giving a rate of elongation of 1800% per minute). After closing the damper completely and turning down the heating element control by 75%, the film was stretched immediately thereafter 3X (200% elongation) in the second direction perpendicular to the first direction of stretch at a rate of 1800% per minute while cooling the film 4.0° C. in 6.7 seconds.

On the basis of the stretched film the following were measured or calculated:

|  | Upper Line | Lower Line |
|---|---|---|
| $x_s =$ | 1.54 | 1.54 |
| $y_s =$ | 1.42 | 1.42 |
| $X_s = \dfrac{x_s}{y_s} =$ | 1.08 | 1.08 |
| Magnification Ratio $(MR) = \dfrac{X_s}{X_c} =$ | 0.98 | 0.98 |

After stretching in two directions, the film was heat-set (while restricting dimensional change) for 10 seconds at 200° C., and the following physical properties were measured. These physical properties were superior to the temperature during both the first and the second directions on an isothermal curve, i. e., maintaining the same temperature during both the first and the second directions of stretch, and this is illustrated in the following table.

Table I

| Property | Film Stretched in Accordance with Example 1 | Film Stretched on an Isothermal Curve |
|---|---|---|
| Tensile Modulus (p. s. i.) | 934,000 | 750,000 |
| Tenacity (p. s. i.) | 32,700 | 21,000 |
| Elongation (percent) | 57.9 | 66.5 |
| Tear (grams) | 48.9 | 18.2 |
| Impact (Kg. cm.) | 258 | 114 |

EXAMPLE 2

In a manner similar to that described in Example 1 and employing the same apparatus, a sheet of substantially amorphous polyethylene terephthalate (second order transition temperature 69° C.) film was heated to 90.1° C. in 42 seconds and then stretched in the first direction 3X (200% elongation) at a rate of 1800% elongation per minute. Immediately thereafter the film was stretched in the second direction to the same extent (3X) and at the same rate while cooling the film 2.6° C. Measurements of the thinnest and thickest areas of the cast film and the stretched film and the resulting calculations of film gauge variation and magnification ratio are as follows:

|  | Upper Line | Lower Line |
|---|---|---|
| $x_c$ | $= 15.0$ | 14.9 |
| $y_c$ | $= 13.6$ | 13.4 |
| $X_s = \dfrac{x_c}{y_c}$ | $= 1.10$ | 1.11 |
| $x_s$ | $= 1.50$ | 1.54 |
| $y_s$ | $= 1.38$ | 1.42 |
| $X_s = \dfrac{x_s}{y_s}$ | $= 1.09$ | 1.09 |
| $MR = \dfrac{X_s}{X_c}$ | $= 0.98$ | 0.98 |

After stretching the film in two directions, the film was subsequently heat-set at 200° C. for 10 seconds, and the following physical properties were measured. These physical properties were superior to those of film stretched in two directions on an isothermal curve or cycle. The physical properties of film produced in accordance with this example may be compared with the physical properties (of film stretched on an isothermal curve) shown in Table I of Example 1.

Table II

| Property | Film Stretched in Accordance with Example 2 |
|---|---|
| Tensile Modulus (p. s. i.) | 928,000 |
| Tenacity (p. s. i.) | 31,500 |
| Elongation (percent) | 60.0 |
| Tear (g.) | 45.2 |
| Impact (Kg. cm.) | 227 |

The foregoing examples are typically representative of the improvement in film gauge uniformity which may be obtained by following the two-step stretching process of this invention. These examples demonstrate that an improvement in gauge uniformity, i. e., a decrease in film gauge variation, may be obtained by following this process. In other words, even though the cast film gauge variation is comparatively low, that is, about 1.10 or less, the corresponding stretched film gauge variation may be decreased below that value by the present process.

EXAMPLE 3

Figure 4:
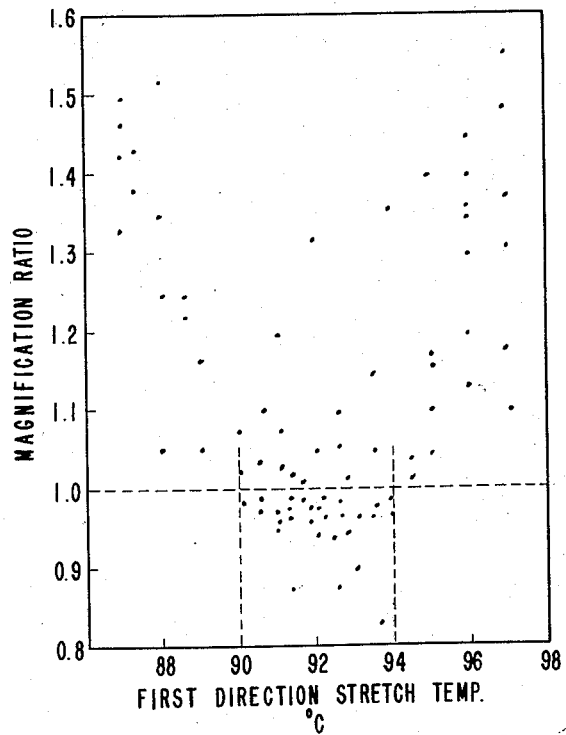

Additional illustrations practicing the present process for stretching amorphous polyethylene terephthalate film in two directions employing the stretching apparatus described hereinbefore are graphically illustrated in Figure 4 which shows that the magnification ratio in a majority of cases is actually decreased by stretching the film in the first direction within a temperature range from 90-94° C. followed by stretching in the second direction while causing the film to cool from 2° C. to 4.5° C. Figure 4 is a plot of Magnification Ratio vs. the Temperature of First Direction Stretch. The points indicated on the plot of Figure 4 represent runs wherein the film was stretched in the first direction at the temperature indicated, and the film was stretched in the second direction while cooling from 2° C. to 4.5° C. First direction stretching carried out at temperatures below 90° C. and above 94° C. show an appreciable increase in the magnification ratio in a considerable majority of the process runs. It is to be emphasized, however, that even the maximum increase shown represents a significant improvement in gauge variation over the results obtainable by the prior art of isothermal stretching (cf. Fig. 6).

In summarizing the data graphically presented in Figure 4, it is shown that:

Out of a total of 46 process runs where first direction stretch was carried out within the range from 90°-94° C., 29 runs gave magnification ratios below 1, and 37 runs gave magnification ratios of 1.05 or less.

Out of a total of 33 process runs where first direction stretch was carried out at temperatures either above 94° C. or below 90° C., none gave magnification ratios below 1 and 5 gave magnification ratios of 1.05 or less.

EXAMPLE 4

Figure 5:
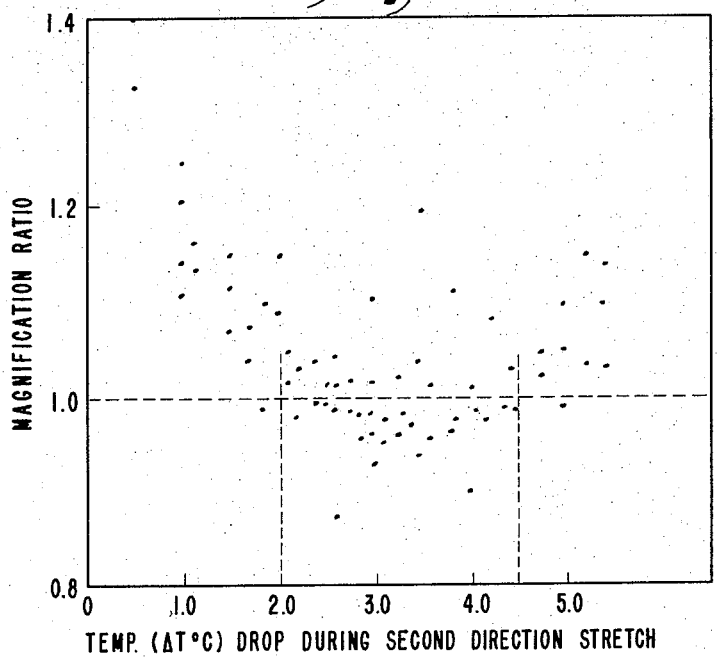

Figure 5 (a plot of Magnification Ratio vs. Temperature Drop During Second Direction Stretch) illustrates the critical nature of the second direction stretching step in which the film cools from 2.0° to 4.5° C. The points indicated on the plot of Figure 5 represent runs wherein the first direction step was carried out at a temperature within the range from 90°-94° C., and the temperature drop (T° C.) was the amount indicated in Figure 5. Cooling the film to an extent of less than 2.0° C. or to an extent greater than 4.5° C. results generally in obtaining magnification ratios greater than those obtained by cooling from 2° C. to 4.5° C.

Summarizing the resulting data presented in Figure 5: Out of a total of 44 process runs wherein the film was cooled from 2.0°-4.5° C. during second direction stretching, 25 runs resulted in magnification ratios below 1, and 39 runs resulted in magnification ratios of 1.05 or less.

Out of a total of 26 process runs wherein the film was cooled either to a lesser extent than 2.0° C. or to a greater extent than 4.5° C., 2 runs gave magnification ratios of less than 1 and 8 runs resulted in magnification ratios of 1.05 or less.

The following examples represent additional embodiments of the present invention as applied to stretching substantially amorphous polyethylene terephthalate film in two directions. The foregoing examples have illustrated an embodiment which comprises stretching the film in the first direction at a constant temperature (isothermally), within the temperature range from 90°-94° C. and thereafter immediately stretching the film in the second direction while cooling the film by an amount from 2°-4.5° C. This particular embodiment for the purpose of illustration will be called Type A stretching pattern. Another type of stretching pattern within the scope of the present invention comprises stretching the polyethylene terephthalate film in the first direction while cooling the film during stretching from 2°-3° C., stretching being started at a temperature within the range from 92°-94° C. Immediately after the first direction stretch, the transverse direction stretch is carried out while continuing to cool the film an additional 2°-3° C. This stretching pattern will be labeled Type B. Another embodiment of the present invention is a slight modification of the Type A stretching pattern. This pattern will be labeled Type A' and is carried out in the same manner as Type A stretching pattern except that 50% of the cooling effected in the second direction stretch is completed in the first 25% of stretch. In effecting this stretching pattern, the ambient temperature of the film is lower than in the Type A stretching pattern, and this effects more rapid cooling of the film during the first portion of stretch in the second direction. Another embodiment of the present invention is a slight modification of the Type B stretching pattern, and this will be labeled Type B'. This modification is carried out in substantially the same manner as Type B stretching pattern except that 50% of the cooling during the second direction stretch is carried out in the first 25% of stretch. Here again, this modification may be effected by maintaining a lower ambient temperature during the initial stages of the second direction stretch. For the purpose of summary, each of the embodiments described above is carried out as briefly described below:

| Type Stretching Pattern | MD Stretch | TD Stretch |
|---|---|---|
| A | Isothermal, 90°-94° C | Cooling, 2°-4.5° C. |
| B | Cooling by 2°-3° C., starting at 92° to 94° C. | Cooling, 2°-3° C., continuing from MD stretch. |
| A' | Same as A except 50% of TD cooling is done in first 25% of stretch. | |
| B' | Same as B except 50% of TD cooling is done in first 25% of stretch. | |

To illustrate the effectiveness of stretching polyethylene terephthalate film in two directions in accordance with each of the above described embodiments, a multiplicity of samples of film were stretched in two directions in accordance with each of the stretching patterns described above. The results of stretching film in accordance with each of these patterns are shown in the following examples.

EXAMPLE 5

TYPE A STRETCHING PATTERN

One hundred samples of polyethylene terephthalate film were stretched in accordance with this stretching pattern. The initial "as cast" film exhibited a gauge variation ($X_c$) of 1.105. Out of 100 samples stretched in accordance with this pattern, 81 samples of stretched film had a magnification ratio of 1.05 or less.

EXAMPLE 6

TYPE B STRETCHING PATTERN

Polyethylene terephthalate film having a cast film gauge variation of 1.105 was stretched in accordance with this stretching pattern. Out of 100 samples of film stretched, 82 samples exhibited a magnification ratio of 1.05 or less.

EXAMPLE 7

TYPE A' STRETCHING PATTERN

The "as cast" polyethylene terephthalate film had a cast film gauge variation of 1.105. Out of 60 samples stretched in accordance with this pattern, all 60 (100%) exhibited a magnification ratio of about 1.02 or less. About 98% of the stretched samples exhibited a magnification ratio of 1 or less.

EXAMPLE 8

TYPE B' STRETCHING PATTERN

The initial "as cast" polyethylene terephthalate film had a cast film gauge variation of 1.105. Out of 60 samples of film stretched in accordance with this pattern, all 60 (100%) exhibited a magnification ratio of about 1.02 or less. About 98% of the stretched samples exhibited a magnification ratio of 1 or less.

The foregoing examples clearly illustrate the advantages of effecting substantially rapid cooling of the film during the early part of the stretching step.

Figure 6:
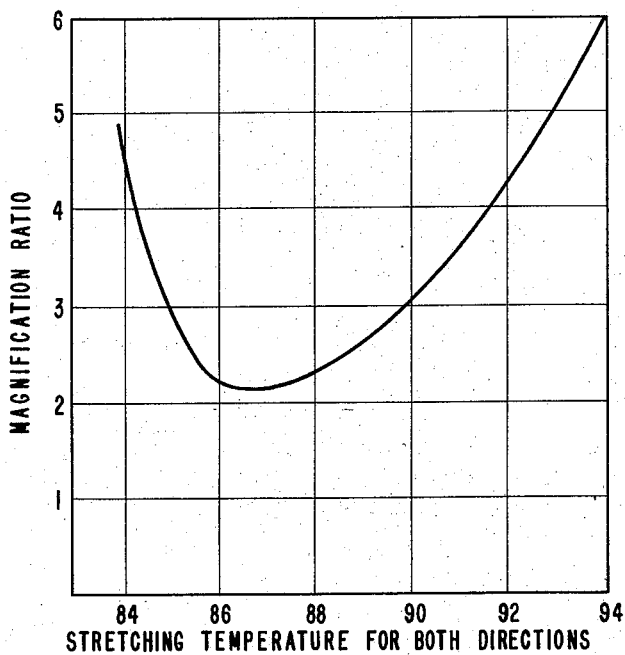

The following examples will illustrate the results obtained, in contrast to the foregoing examples, by stretching polyethylene terephthalate films in accordance with stretching processes taught by the prior art. In practicing the known process of stretching film at a constant selected temperature, i. e., on an isothermal curve, the magnification ratios obtainable were greater than 2, as shown in the graph presented in Figure 6. The graph of Figure 6 illustrates a plot of data obtained from process runs where amorphous polyethylene terephthalate film was stretched in two directions on an isothermal curve. Stretching in the two directions was carried out at substantially the same selected temperature within the range from 84°–94° C. The minimum magnification ratio obtained was about 2.1, and this was obtained by carrying out stretching in both directions while maintaining the film temperature at about 2.1, and this was obtained by carrying out stretching in both directions while maintaining the film temperature at about 86.5° C.

EXAMPLE 9

An amorphous, polyethylene terephthalate film was stretched in the first direction at a temperature of 88° C. and thereafter stretched in the second direction perpendicular thereto at a constant temperature of 95° C., and heat-set. The following values of $X_c$ (cast film gauge variation), $X_s$ (stretched film gauge variation), and MR (magnification ratio) were calculated from gauge measurements made on the cast film and the stretched film.

|  | Upper Line | Lower Line |
|---|---|---|
| $X_c=$ | 1.10 | 1.08 |
| $X_s=$ | 1.89 | 2.32 |
| $MR=\frac{X_s}{X_c}=$ | 1.72 | 2.15 |

EXAMPLE 10

Example 3 was repeated except that the film was stretched in the first direction at 90° C. and in the second direction at a temperature of 95° C.

|  | Upper Line | Lower Line |
|---|---|---|
| $X_c=$ | 1.06 | 1.06 |
| $X_s=$ | 2.16 | 2.28 |
| $MR=\frac{X_s}{X_c}=$ | 2.04 | 2.15 |

EXAMPLE 11

Example 3 was repeated except that the film was stretched in the first direction at a temperature of 86° C. and in the second direction at a temperature of 94° C.

|  | Upper Line | Lower Line |
|---|---|---|
| $X_c=$ | 1.06 | 1.07 |
| $X_s=$ | 1.76 | 2.10 |
| $MR=\frac{X_s}{X_c}=$ | 1.66 | 1.96 |

The benefits of the present process are most fully realized when it is carried out in a continuous manner, and this may be done by employing a series of differential speed stretching rolls for stretching in the first direction and a tentering apparatus which stretches the film continuously in a second direction. However, the present process is not restricted with respect to the type of apparatus employed for carrying out the two-way stretching step. Any convenient arrangement of stretching apparatus for carrying out a two-step process may be employed, and the film may be uniformly heated by hot air currents, or by other suitable means such as by infrared radiation sources, steam, in a liquid bath such as water, or by electrical means such as high frequency dielectric heating apparatus.

Oriented polyethylene terephthalate film produced by the present process may be employed in a large variety of applications; and, owing to its outstanding strength and toughness in the oriented form, it can be used in calipers as low as 0.25 mil. Included among the general and many specific uses for polyethylene terephthalate film are the following: household wrapping material, flexible luminous ceiling covering, covering for camelback, as a wrapping material for explosives such as dynamite, as a glass replacement in electric fuse windows and fuse bodies, as a map base wherein a coating thereon is scribed with an imprint of a map and thereafter used as a negative for copies, teletype tape, heat-reflective lamp shades, twisted strands of film for use in tire cord, as a filament in the form of twisted strands of film for summer-type rugs, a material of construction for trampolines, as a fire barrier material in roof and floor construction, expandable package tops wherein popcorn may be directly cooked, scouring pads fabricated from twisted strands of film, and as a primary closure for containers of all varieties wherein the film may be stretched tightly over the mouth of a container, e. g., glass bottle adhered to the underside of the lip of the mouth of the container. Polyethylene terephthalate film which has not been heat-set, that is, heat-shrinkable film, may be employed in the form of twisted strands for braiding into rope which is heat-shrinkable, as a heat-shrinkable covering for electrical capacitors, as a heat-shrinkable covering for containers of all varieties including glass and metal containers, and as a shatterproof protective covering for metal containers and bulbs of all varieties including milk bottles, fluorescent lighting tubes, incandescent lamp bulbs, and large television picture tubes, etc.

What is claimed is:

1. A process for orienting a thermoplastic polymeric film which comprises heating thermoplastic polymeric film heavy gauge variations and an initial maximum thickness of not over 20 mils to a uniform temperature substantially above its second order transition temperature and below the temperature at which molecular orientation is not effected by stretching, stretching the film in the direction in which said gauge variations are measured while cooling the film at a rate sufficient to create and maintain a temperature differential of from 0.5°–2.5° C., between thick and thin areas of the film, and completing stretching before the temperature of any area of the film is cooled to said second order transition temperature.

2. The process of claim 1 wherein the thermoplastic polymeric film is polyethylene terephthalate film.

3. A process for continuously biaxially-orienting a thermoplastic polymeric film which comprises heating thermoplastic, polymeric continuous film having gauge variations measured in the transverse direction, and an initial maximum thickness of not over 20 mils, to a uniform temperature substantially above its second order transition temperature and below the temperature at which molecular orientation is not effected on stretching, continuously stretching the heated film in the machine direction while maintaining the temperature of the film substantially constant, and thereafter continuously stretching said film in the transverse direction while cooling the film at a rate sufficient to create and maintain a temperature differential of from 0.5°–2.5° C. between thick and thin areas of the film, and completing stretching before the temperature of any area of the film is cooled to said second order transition temperature.

4. The process of claim 3 wherein the thermoplastic polymeric film is polyethylene terephthalate film.

5. A process for biaxially-orienting polyethylene terephthalate film which comprises heating polyethylene terephthalate film having gauge variations, measured in the transverse direction of the film, and an initial maximum thickness of not over 20 mils, to a uniform temperature within the range of from 90°–94° C., stretching said film in the longitudinal direction of the film at said uniform temperature, and immediately thereafter stretching said film in the transverse direction while cooling said film at a rate sufficient to reduce the temperature thereof from 2°–4.5° C. during stretching.

6. The process, according to claim 5, wherein about one-half of the film temperature reduction during stretching in the transverse direction is effected in the first 25% of the total stretch.

7. The process of claim 5 wherein the film is stretched in each direction about 200% at the rate of about 1800% per minute.

8. The process of claim 7 wherein the biaxially-oriented film is heat-set at a temperature within the range of from 150°–250° C. while restricting dimensional change.

9. A process for biaxially-orienting polyethylene terephthalate film which comprises heating polyethylene terephthalate film having an initial maximum thickness of not over 20 mils to a uniform temperature within the range of from 92°–94° C., stretching the film in one direction while cooling said film at a rate sufficient to reduce the temperature thereof 2°–3° C. during stretching, and immediately thereafter stretching the film in the transverse direction while cooling said film at a rate sufficient to further reduce the temperature thereof 2°–3° C. during stretching.

10. The process, according to claim 9, wherein about one-half of the film temperature reduction during stretching in the transverse direction is effected in the first 25% of the total stretch.

11. The process of claim 9 wherein the film is stretched in each direction about 200% at the rate of about 1800% per minute.

12. The process of claim 11 wherein the biaxially-oriented film is heat-set at a temperature within the range of from 150°–250° C. while restricting dimensional change.

References Cited in the file of this patent

UNITED STATES PATENTS

| | | |
|---|---|---|
| 2,335,190 | Minich | Nov. 23, 1943 |
| 2,412,187 | Wiley et al. | Dec. 3, 1946 |
| 2,490,781 | Cloud | Dec. 13, 1949 |
| 2,578,899 | Pace | Dec. 18, 1951 |
| 2,728,941 | Alles et al. | Jan. 3, 1956 |

UNITED STATES PATENT OFFICE
CERTIFICATE OF CORRECTION

Patent No. 2,851,733 September 16, 1958

William J. Pangonis et al.

It is hereby certified that error appears in the printed specification of the above numbered patent requiring correction and that the said Letters Patent should read as corrected below.

Column 5, line 42, for "lb./cut. ft." read -- lb./cu. ft. --; column 9, lines 71 to 75 inclusive, should appear as shown below instead of as in the patent:

-- same physical properties of film stretched in two directions on an isothermal curve, i. e., maintaining the same temperature during both the first and the second directions of stretch, and this is illustrated in the following table. --.

Signed and sealed this 16th day of December 1958.

(SEAL)
Attest:

KARL H. AXLINE
Attesting Officer

ROBERT C. WATSON
Commissioner of Patents